(12) United States Patent
Hirose et al.

(10) Patent No.: US 7,590,700 B2
(45) Date of Patent: Sep. 15, 2009

(54) EMAIL MULTICASTING DEVICE

(75) Inventors: Masaki Hirose, Yokohama (JP); Mayuko Mori, Tokyo (JP); Daisuke Kikuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 785 days.

(21) Appl. No.: 11/215,143

(22) Filed: Aug. 30, 2005

(65) Prior Publication Data

US 2006/0053206 A1 Mar. 9, 2006

(30) Foreign Application Priority Data

Aug. 31, 2004 (JP) ............................. 2004-252921

(51) Int. Cl.
*G06F 15/16* (2006.01)
(52) U.S. Cl. .................................................... 709/206
(58) Field of Classification Search .................. 709/206
See application file for complete search history.

(56) References Cited

U.S. PATENT DOCUMENTS

| | | | |
|---|---|---|---|
| 5,754,778 A | | 5/1998 | Shoujima |
| 5,937,162 A * | | 8/1999 | Funk et al. .................. 709/206 |
| 6,047,310 A * | | 4/2000 | Kamakura et al. .......... 709/201 |
| 6,185,605 B1 | | 2/2001 | Kowaguchi |
| 6,226,670 B1 * | | 5/2001 | Ueno et al. .................. 709/207 |
| 6,237,027 B1 * | | 5/2001 | Namekawa .................. 709/206 |
| 6,311,195 B1 | | 10/2001 | Hachiya et al. .............. 707/512 |
| 6,311,210 B1 * | | 10/2001 | Foladare et al. ............. 709/206 |
| 6,327,610 B2 * | | 12/2001 | Uchida et al. ................ 709/206 |
| 6,411,393 B1 * | | 6/2002 | Wakasugi .................... 358/1.15 |
| 6,591,273 B2 * | | 7/2003 | Jenkins et al. ............... 707/102 |
| 7,058,687 B2 * | | 6/2006 | Kucherawy .................. 709/206 |
| 7,219,131 B2 * | | 5/2007 | Banister et al. ............. 709/206 |
| 7,237,028 B2 * | | 6/2007 | Pfeffer et al. ................ 709/226 |
| 7,395,314 B2 * | | 7/2008 | Smith et al. .................. 709/206 |
| 7,401,155 B2 * | | 7/2008 | Cooper et al. ............... 709/233 |
| 2002/0038347 A1 * | | 3/2002 | Maeda ......................... 709/206 |
| 2002/0049820 A1 * | | 4/2002 | Ueda ........................... 709/206 |

(Continued)

FOREIGN PATENT DOCUMENTS

EP 1 422 953 A2 5/2004

(Continued)

OTHER PUBLICATIONS

Chinese Office Action issued Feb. 15, 2008 in Chinese patent application No. 200510092800.1 (with translation).

(Continued)

*Primary Examiner*—Bunjob Jaroenchonwanit
*Assistant Examiner*—Robert B McAdams
(74) *Attorney, Agent, or Firm*—Brinks Hofer Gilson & Lione

(57) ABSTRACT

The present invention provides an email multicasting device which changes a distribution interval of emails dynamically in accordance with the number of emails to be multicast. The email multicasting device pre-stores on a client basis, mobile numbers of users which are destinations of an email. The email multicasting device, when receiving mail contents from a client, creates plural emails each of which contains the mail contents and one of mobile numbers associated with the client, and queues the emails in a buffer area. The queued emails are distributed sequentially at predetermined time intervals by the email multicasting device.

23 Claims, 13 Drawing Sheets

U.S. PATENT DOCUMENTS

| | | |
|---|---|---|
| 2002/0095466 A1 | 7/2002 | Ushigusa |
| 2004/0243679 A1* | 12/2004 | Tyler .......................... 709/206 |
| 2005/0033812 A1* | 2/2005 | McCarthy et al. ........... 709/206 |
| 2005/0198155 A1* | 9/2005 | Zakharoff ................... 709/206 |

FOREIGN PATENT DOCUMENTS

| | | |
|---|---|---|
| JP | H09-051353 A | 2/1997 |
| JP | 2001-350702 | 12/2001 |
| JP | 2002-207669 A | 7/2002 |
| JP | 2003-044409 | 2/2003 |
| JP | 2004-193732 | 7/2004 |
| TW | 401548 | 8/2000 |
| WO | WO 2004/049737 A2 | 6/2004 |

OTHER PUBLICATIONS

EPO Office Action dated Apr. 20, 2006.
Korean Office Action, KR Pat. App. No. 10-2005-0079736, Nov. 7, 2006.
Taiwanese Office Action, TW Pat. App. No. 094,129,750, Oct. 20, 2006.
Japanese Office Action w/ English translation dated Apr. 7, 2009, for Japanese Patent Application No. 2004-252921, 4 pgs.

* cited by examiner

| BUFFER AREA | DISTRIBUTION INTERVAL (SECOND) | OCCUPANCY STATE FLAG |
|---|---|---|
| BUFFER a | 0.1 | 0 |
| BUFFER b | 0.1 | 0 |
| BUFFER c | 0.1 | 1 |
| BUFFER d | 0.2 | 0 |
| BUFFER e | 0.2 | 1 |
| BUFFER f | 0.2 | 0 |
| BUFFER g | 0.5 | 1 |
| BUFFER h | 0.5 | 0 |
| BUFFER i | 0.5 | 0 |

FIG. 6

| CLIENT | DESTINATION | BUFFER AREA |
|---|---|---|
| ..... | 090✱✱✱✱✱✱✱✱ | BUFFER a |
| | 090✱✱✱✱✱✱✱✱ | BUFFER b |
| | 090✱✱✱✱✱✱✱✱ | BUFFER c |
| | ... | |
| | ... | |
| | ... | |
| ..... | ... | BUFFER d |
| | ... | BUFFER e |
| | ... | BUFFER f |
| | ... | |
| | ... | |
| | ... | |

FIG. 13

| BUFFER AREA | OCCUPANCY STATE FLAG |
|---|---|
| BUFFER a | 0 |
| BUFFER b | 0 |
| BUFFER c | 1 |
| BUFFER d | 0 |
| BUFFER e | 1 |
| BUFFER f | 0 |
| BUFFER g | 1 |
| BUFFER h | 0 |
| BUFFER i | 0 |

FIG. 14

| DISTRIBUTION INTERVAL (SECOND) | EMAIL NUMBER |
|---|---|
| 0.1 | LESS THAN 500 |
| 0.2 | 500 OR MORE AND LESS THAN 1000 |
| 0.5 | 1000 OR MORE |

EMAIL MULTICASTING DEVICE

This application claims priority under 35 U.S.C. § 119 to Japanese Patent Application No. 2004-252921 filed Aug. 31, 2004, the entire content of which is hereby incorporated by reference.

BACKGROUND

1. Field of the Invention

The present invention relates to a technique of multicasting an email, and particularly relates to a technique of multicasting an email without causing congestion on a network.

2. Description of the Related Art

In recent years, a variety of techniques for supporting data communication using an email have been proposed. For example, Japanese Patent Application Laid-open Publication No. 09-51353 discloses an email server which changes the amount of data distributed as an email dynamically in accordance with the remaining amount of memory of a receiving terminal. The email server acquires information on the remaining amount of memory of a terminal device in advance, and before sending an email to the terminal device, compares the data amount of the email and the remaining amount of memory of the terminal device. If the latter is smaller, the email server divides the email at every breakpoint such as a punctuation and a period, and sends the divided emails sequentially. The terminal device, when receiving the divided emails, restores the original email by reconstructing the divided emails.

Japanese Patent Application Laid-open Publication No. 2002-207669 discloses a mail server which controls the data amount of an advertisement mail distributed by an advertiser. The mail server mediates an advertisement mail from an advertiser who is a sender of an advertisement mail to user terminals which are receivers of the advertisement mail. The mail server receives information on advertisement distribution conditions from each user terminal, and registers the information in its database. The mail server, when receiving from an advertiser an advertisement mail, adjusts the data amount of the advertisement mail for each user with reference to information on advertisement distribution conditions registered in the database, and distributes the advertisement mail to each user terminal.

However, the techniques disclosed in the above publications cannot solve a problem of congestion on a network which can be caused by multicasting of an email.

In recent years, an information service where information relating to a certain genre is sent as an email to multiple destinations has been known.

A server providing such an information service pre-registers the email addresses of users requesting an information service in its database, and if new information to be distributed is prepared, sends an email containing the information to the registered email addresses via nodes constituting the Internet and/or a mobile packet communication network.

In the information service, since a large number of emails are distributed in a relatively short time, if the destinations of the emails are concentrated in one area, an excessive load is applied to a network of the area, and thereby it is possible that congestion is caused on the network.

The present invention has been made in view of the above circumstances, and provides an email multicasting device which changes a distribution interval of emails dynamically in accordance with the number of emails to be multicast.

BRIEF SUMMARY

An email multicasting device according to an embodiment of the present invention comprises: a plurality of buffer areas; buffer-related information storage means which stores a buffer area identifier of each of the buffer areas in association with interval data indicating a distribution time interval at which emails queued in the buffer area are sent; client information storage means which stores a client identifier of a client requesting email distribution in association with a plurality of email destinations notified by the client in advance and a buffer area identifier; distribution request reception means which receives mail contents to be multicast as an email and a client identifier; buffer area identifying means which reads out a buffer area identifier associated with the client identifier received by the distribution request reception means from the client information storage means, and identifies a buffer area identified by the buffer area identifier; email creation means which reads out a plurality of email destinations associated with the client identifier received by the distribution request reception means from the client information storage means, and creates a plurality of emails each of which contains the mail contents received by the distribution request reception means and one of the plurality of email destinations; queuing means which queues the plurality of emails created by the email creation means in the buffer area identified by the buffer area identifying means; and email distribution means which reads out interval data associated with the buffer area identifier read out by the buffer area identifying means, from the buffer-related information storage means, and distributes the plurality of emails queued by the queuing means sequentially at time intervals indicated by the interval data.

An email multicasting device according to another embodiment of the present invention comprises: a plurality of buffer areas; buffer-related information storage means which stores a buffer area identifier of each of the buffer areas in association with interval data indicating a distribution time interval at which emails queued in the buffer area are sent; client information storage means which stores a client identifier of a client requesting email distribution in association with a buffer area identifier; distribution request reception means which receives a plurality of email destinations, mail contents to be multicast to the plurality of email destinations, and a client identifier; buffer area identifying means which reads out a buffer area identifier associated with the client identifier received by the distribution request reception means from the client information storage means, and identifies a buffer area identified by the buffer area identifier; email creation means which creates a plurality of emails each of which contains the mail contents received by the distribution request reception means and one of the plurality of email destinations received by the distribution request reception means; queuing means which queues the plurality of emails created by the email creation means in the buffer area identified by the buffer area identifying means; and email distribution means which reads out interval data associated with the buffer area identifier read out by the buffer area identifying means, from the buffer-related information storage means, and distributes the plurality of emails queued by the queuing means sequentially at time intervals indicated by the interval data.

In the above email multicasting devices, if an email is already queued in the buffer area indicated by the buffer area identifier, the buffer area identifying means may identify another buffer area where an email is not queued in accordance with a predetermined algorithm.

An email multicasting device according to another embodiment of the present invention comprises: a plurality of buffer areas; interval data storing means which stores interval data indicating a distribution time interval at which emails queued in each of the buffer areas are sent, in association with a range of a number of emails which are to be distributed sequentially at time intervals indicated by the interval data; distribution request reception means which receives a plurality of email destinations, mail contents to be multicast to the plurality of email destinations, and a client identifier; area identifying means which obtains data of an area where each of the plurality of email destinations received by the distribution request reception means is located; email destination classification means which classifies into groups the plurality of email destinations received by the distribution request reception means on a distribution area basis on the basis of the area data obtained by the area identifying means; email creation means which creates a plurality of emails each of which contains the mail contents received by the distribution request reception means and one of email destinations belonging to a group of the plurality of email destinations classified by the email destination classification means; queuing means which queues the plurality of emails created by the email creation means in a buffer area; count means which counts a number of the plurality of emails queued in the buffer area by the queuing means; and email distribution means which reads out interval data associated with a range of a number of emails to which the number counted by the count means belongs, from the interval data storing means, and distributes the plurality of emails queued by the queuing means sequentially at time intervals indicated by the interval data.

According to an embodiment of the present invention, a distribution interval of emails can be changed dynamically in accordance with the number of emails to be multicast.

BRIEF DESCRIPTION OF THE DRAWINGS

Embodiments of the present invention will be described in detail with reference to the following figures, wherein:

FIG. 6 is a diagram showing a data structure of a client information database;

FIG. 13 is a diagram showing a data configuration of a buffer area availability database;

FIG. 14 is a diagram showing a data configuration of an interval data database;

DETAILED DESCRIPTION OF THE DRAWINGS AND THE PRESENTLY PREFERRED EMBODIMENTS

First Embodiment

A first embodiment of the present invention will be described. In the following description, a term "carrier" refers to a corporation which manages a mobile packet communication network, and a term "client" refers to a corporation which entrusts the carrier with multicasting of mail contents created by the client. The client has a client ID and a password which are issued by the carrier, and the client ID is character strings unique to each client. A term "user" refers to an individual or a corporation that has performed a predetermined registration procedure for receiving mail contents created by the client.

Figure 1:
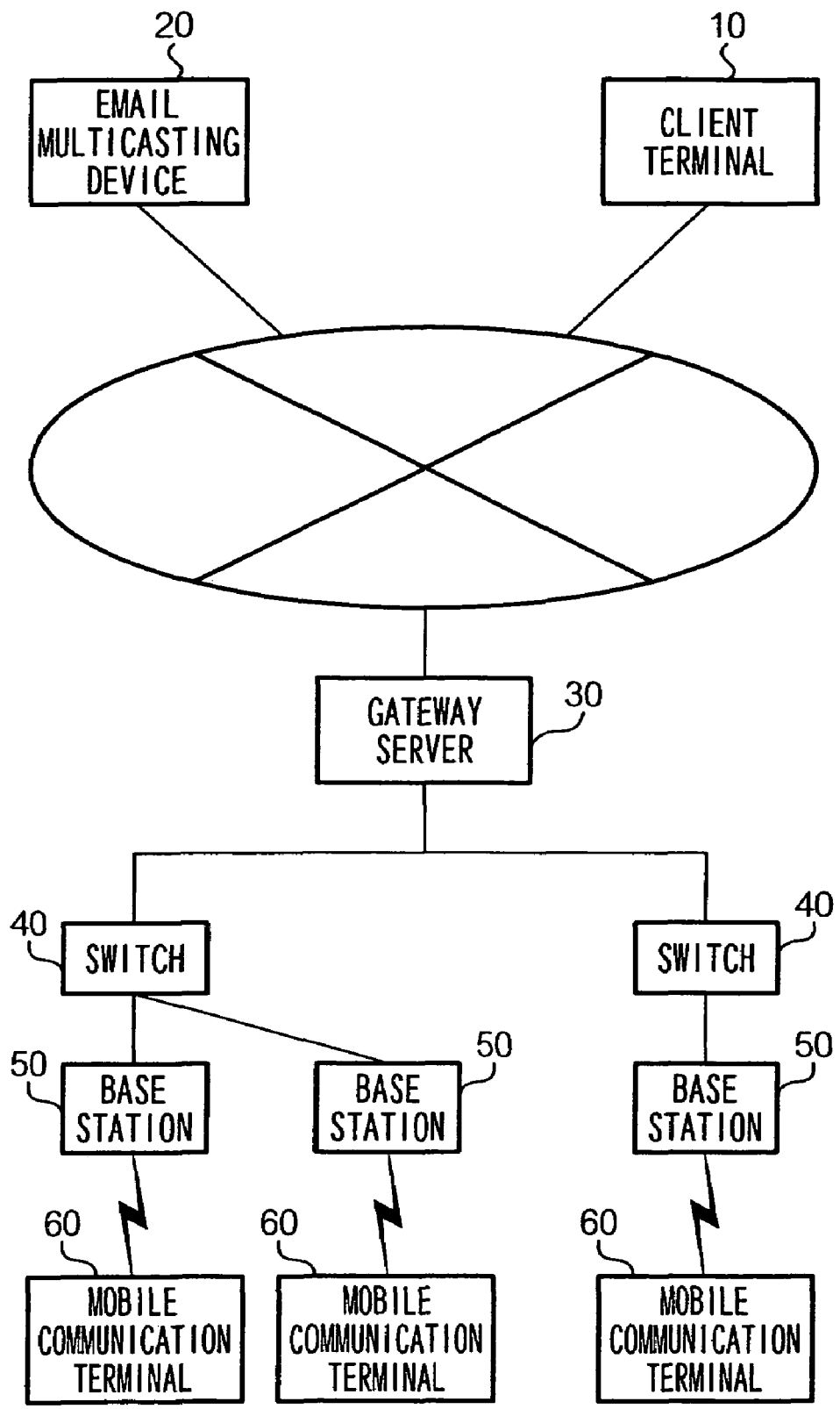
FIG. 1 is a diagram showing a configuration of an email distribution control system.

FIG. 1 is a diagram showing a configuration of an email distribution control system according to the present embodiment.

The email distribution control system comprises the Internet and a mobile packet communication network.

The Internet is a collection of nodes which send data using TCP (Transmission Control Protocol)/IP (Internet Protocol), and HTTP (Hypertext Transfer Protocol) and SMTP (Simple Mail Transfer Protocol) which are upper protocols of TCP/IP, and has plural client terminals 10 and email multicasting device 20.

Figure 2:
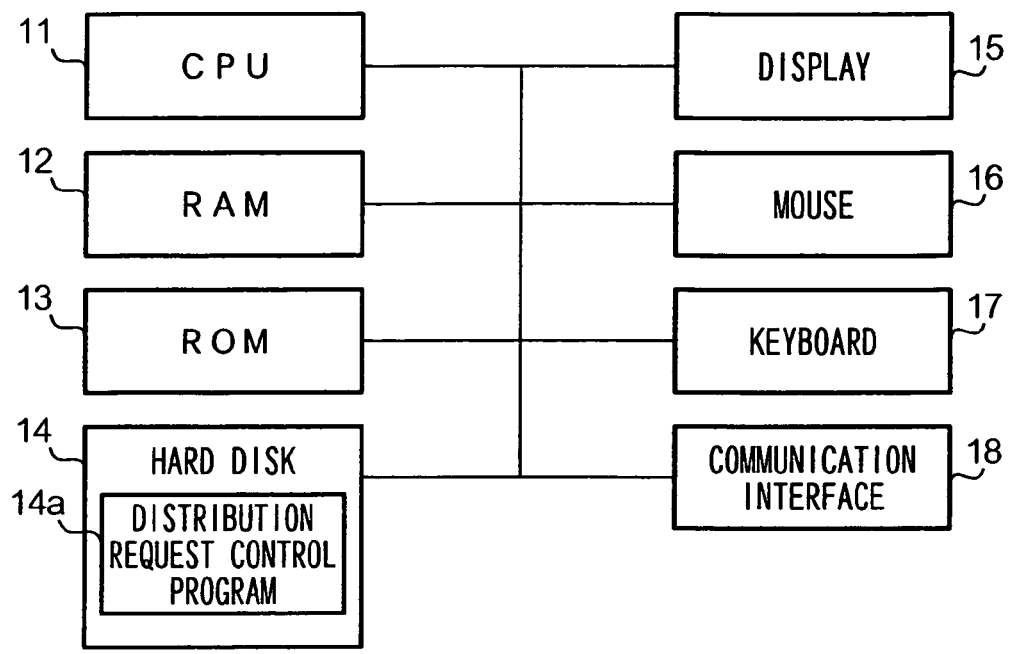
FIG. 2 is a diagram showing a hardware configuration of a client terminal.

FIG. 2 is a block diagram showing a hardware configuration of client terminal 10. Client terminal 10 is a computer used by each client, and as shown in the drawing, comprises: CPU 11 which controls the operation of client terminal 10; RAM 12 which is used as a working area of CPU 11; ROM 13 which stores an IPL (Initial Program Loader), etc.; hard disk 14; display 15; mouse 16; keyboard 17; and communication interface 18.

Hard disk 14 stores, in addition to an OS (Operating System) which is not shown in the drawing, distribution request control program 14a. When CPU 11 executes the program while using RAM 12 as a working area, an email multicasting request function is realized in client terminal 10.

Figure 3:
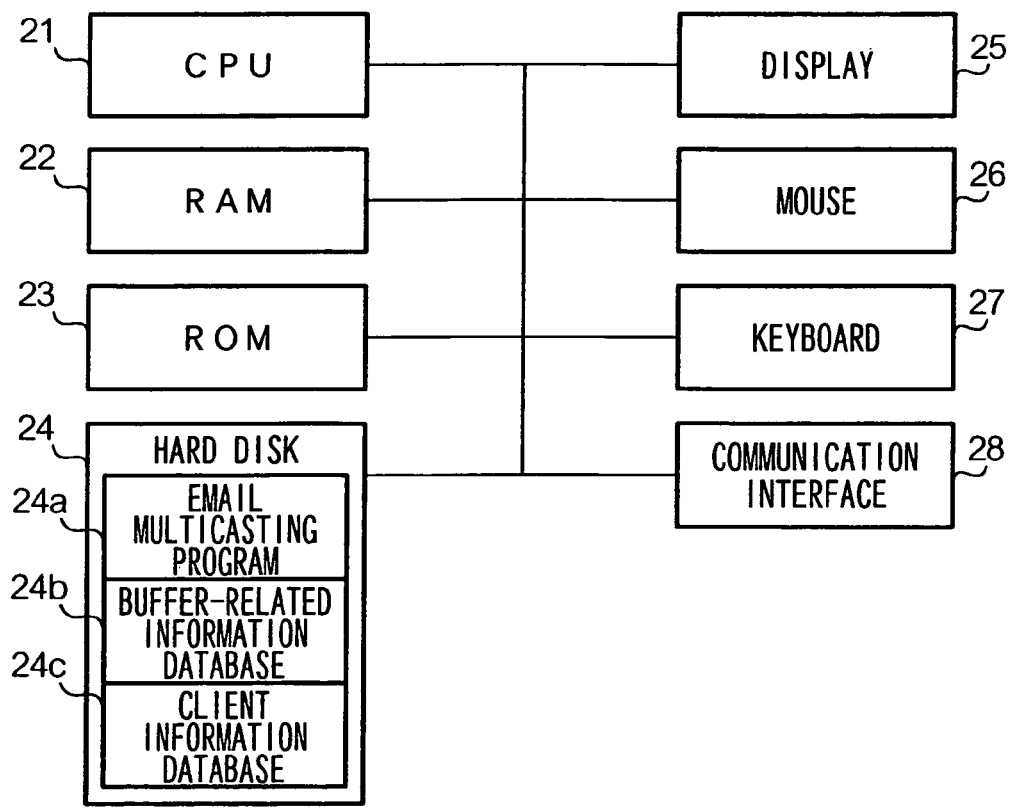
FIG. 3 is a diagram showing a hardware configuration of an email multicasting device.

FIG. 3 is a block diagram showing a hardware configuration of email multicasting device 20. Email multicasting device 20 is a computer managed by a carrier, and as shown in the drawing, comprises: CPU 21; RAM 22; ROM 23; hard disk 24; display 25; mouse 26; keyboard 27; and communication interface 28.

Hard disk 24 stores, in addition to an OS which is not shown in the drawing, email multicasting program 24a, buffer-related information database 24b, and client information database 24c.

Figures 4, 5:
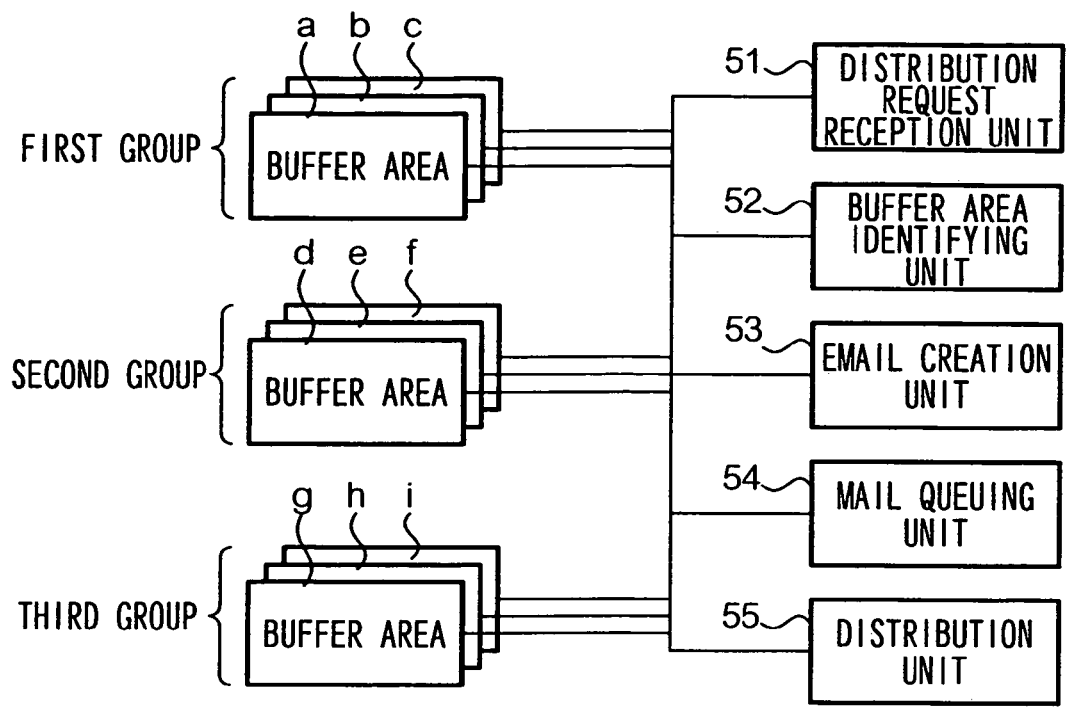
FIG. 4 is a diagram showing a logical configuration realized by the email multicasting device.
FIG. 5 is a diagram showing a data structure of a buffer-related information database.

When CPU 21 executes email multicasting program 24a while using RAM 22 as a working area, units shown in FIG. 4 are realized logically. Specifically, plural buffer areas a to i for queuing emails are reserved in RAM 22, and CPU 21 functions as distribution request reception unit 51, buffer area identifying unit 52, email creation unit 53, mail queuing unit 54, and distribution unit 55.

Buffer areas a to i reserved in RAM 22 are divided into three groups: the first group of buffer areas a to c for short interval distribution; the second group of buffer areas d to f for medium interval distribution; and the third group of buffer areas g to i for long interval distribution. Emails queued in each buffer area is distributed to a network sequentially at distribution intervals registered in association with the buffer area in buffer-related information database 24b which is described later.

Now, an operation of each unit realized by CPU 21 will be described. Distribution request reception unit 51 receives a distribution request containing mail contents and a client ID via communication interface 28. Buffer area identifying unit 52 identifies a buffer area to be assigned to a client which is the source of a distribution request. Email creation unit 53 creates a plurality of emails each of which contains mail contents and destination data contained in a distribution request. Mail queuing unit 54 queues emails created by email creation unit 53 in a buffer area identified by buffer area identifying unit 52. Distribution unit 55 distributes emails queued in a buffer area sequentially at distribution intervals associated with the buffer area.

Buffer-related information database 24b is a collection of plural records, each of which is created for each buffer area. As shown in FIG. 5, one record constituting the database has three fields: "buffer area"; "distribution interval"; and "occupancy state flag". In the "buffer area" field, a buffer area identifiers of any of identifying buffer areas a to i reserved in RAM 22 is stored. In the "distribution interval" field, interval data is stored. The interval data is a parameter indicating a time interval at which emails queued in a buffer area are distributed. In the "occupancy state flag" field, an occupancy state flag is stored. The occupancy state flag is data indicating whether a buffer area is occupied. If a buffer area is occupied, a value "1" is stored as the occupancy state flag, and if the buffer area is not occupied, a value "0" is stored as the occupancy state flag. Once a buffer area is occupied, the occupancy state is not reset until distribution of all emails queued in the buffer area is completed.

In buffer-related information database 24B of FIG. 5, interval data of "0.1" which is the shortest distribution interval is set for buffer areas a to c belonging to the first group, interval data of "0.2" which is the second-shortest distribution interval is set for buffer areas d to f belonging to the second group, and interval data of "0.5" which is the longest distribution interval is set for buffer areas g to i belonging to the third group. By setting a time interval for each group as just described and using a buffer area depending on the number of emails to be queued, even if the number of emails is large and destinations of the emails are concentrated on one area, a risk of congestion on a network is reduced, and if the number of emails is small, distribution of the emails can be completed quickly. The detail of the distribution process will be described later.

Client information database 24c is a collection of plural records each of which is created for each client. As shown in FIG. 6, one record constituting the database has three fields: "client"; "destination"; and "buffer area". In the "client" field, the client ID of each client is stored. In the "destination" field, the mobile numbers of plural users which are destinations of an email are stored. In the "buffer area" field, the buffer area identifiers of buffer areas that may be occupied for queuing emails are stored. Data stored in the "client" and "destination" fields is acquired from client terminal 10 in a destination registration process which is described later, and data stored in the "buffer area" field is determined by the data stored in the "destination" field in the destination registration process.

Now, FIG. 1 is referred to again. The mobile packet communication network is a collection of nodes which sends data using simplified TCP/IP and HTTP which is an upper protocol of TCP/IP, and comprises: gateway server 30; switches 40; base stations 50; and mobile communication terminals 60.

Gateway server 30 performs a protocol conversion to exchange data such as an email and HTML (Hypertext Markup Language) data between the mobile packet communication network and the Internet.

Switch 40 is a computer system provided in a switching center serving plural base stations 50, and delivers a received email to mobile communication terminal 60 via base stations 50 operating under the jurisdiction of the switch.

Base station 50 is arranged in every wireless area with a radius of, e.g., 500 meters, and performs wireless communication with mobile communication terminal 60 located in each wireless area.

Mobile communication terminal 60 comprises: a voice input/output unit for performing voice communication; a wireless communication unit for performing wireless communication with base station 50; a display such as a liquid crystal panel; an operation unit for inputting figures and characters; and a microcomputer for controlling the above units. Mobile communication terminal 60 is connected to a mobile telephone network (not shown) as well as to the mobile packet communication network shown in FIG. 1. Also, mobile communication terminal 60 has software for browsing document data (browser), and can display an email sent via the mobile packet communication network.

Next, an operation of the present embodiment will be described. The operation of the present embodiment is divided into a destination registration process and a multicasting process.

Figure 7:
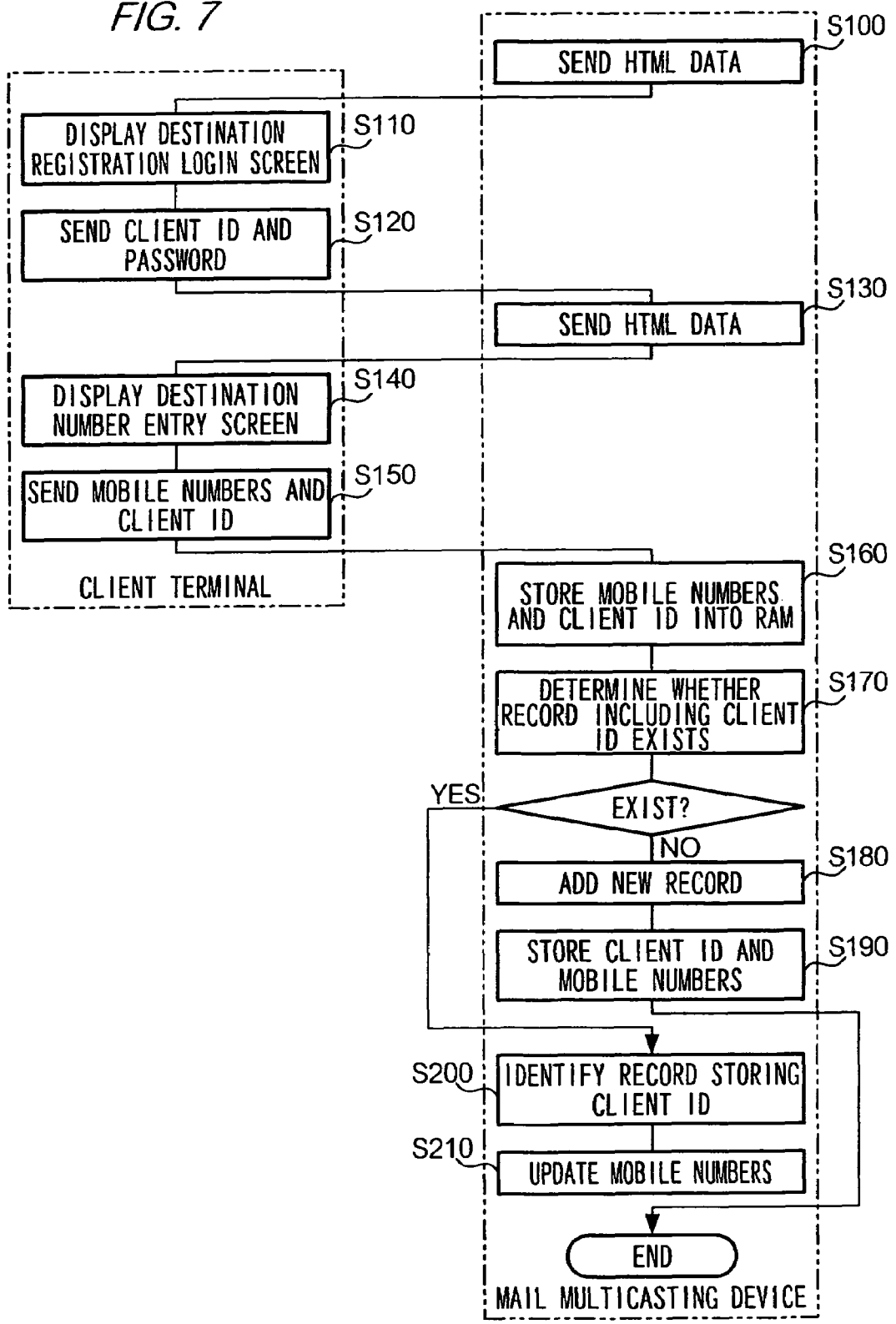
FIG. 7 is a flowchart showing a destination registration process.

FIG. 7 is a flowchart showing the destination registration process. The process is started when client terminal 10 of a client accesses a website for the destination registration process by designating the URL (Uniform Resource Locator) of the website.

When client terminal 10 accesses the website by designating the URL of the website, CPU 21 of email multicasting device 20 reads out HTML data identified by the URL from its hard disk 24 and sends it to client terminal 10 (S100).

CPU 11 of client terminal 10, when receiving the HTML data, causes display 15 to display a destination registration login screen on the basis of the HTML data (S110). The screen displays a message "This is a site for destination registration. Please enter your client ID and password." and entry fields where a client ID and a password can be entered. An operator of client terminal 10 enters the client ID and the password of the client in the entry fields on the screen.

CPU 11 of client terminal 10 sends the entered client ID and password to email multicasting device 20 (S120).

CPU 21 of email multicasting device 20 authenticates the client on the basis of the client ID and password received from client terminal 10, and if the authentication is completed, sends HTML data of a destination number entry screen to client terminal 10 (S130).

CPU 11 of client terminal 10, when receiving the HTML data, causes display 15 to display the destination number entry screen on the based of the HTML data (S140). The screen displays a message "Please enter mobile numbers to be registered as destinations of an email." and plural entry fields where mobile numbers can be entered. The operator of client terminal 10 enters in the entry fields, mobile numbers of users who have performed a registration procedure for receiving emails from the client.

When mobile numbers are entered, CPU 11 of client terminal 10 sends the entered mobile numbers and the client ID entered on the destination registration login screen to email multicasting device 20 (S150).

CPU 21 of email multicasting device 20 stores in RAM 22 the mobile numbers and client ID received from client terminal 10 (S160).

Subsequently, CPU 21 refers to client information database 24c stored in its hard disk 24 to determine whether a record including the client ID stored in RAM 22 in S160 exists in the database (S170).

If the determination in S170 is negative, CPU 21 adds a new record to client information database 24c (S180). In the "client" field of the added record, the client ID stored in RAM 22 in S160 is stored, and in the "destination" field of the same record, the mobile numbers stored in RAM 22 in S160 are stored (S190).

On the other hand, if the determination S170 is affirmative, CPU 21 identifies the record including the client ID (S200), and updates data stored in the "destination" field of the identified record with the mobile numbers stored in RAM 22 in S160 (S210).

The destination registration process is thus completed. In email multicasting device 20, updates of client information database 24c are monitored constantly. If a new record is added to the database, or if an existing record is updated, the newly added or updated record is identified, the number of mobile numbers stored in the "destination" field of the record is counted, and the buffer area identifier of a buffer area appropriate for the counted number is stored in the "buffer area" field of the record.

In a case of the present embodiment, if the number of mobile numbers stored in the "destination" field is less than 500, buffer areas a to c belonging to the first group are assigned; if the number is 500 or more and less than 1000, buffer areas d to f belonging to the second group are assigned; and if the number is 1000 or more, buffer areas g to i belonging to the third group are assigned. Accordingly, if the number of mobile numbers of a newly added or updated record is 700, the buffer area identifiers of buffer areas g to i belonging to the second group are stored in the "buffer area" field of the record.

Figure 8:
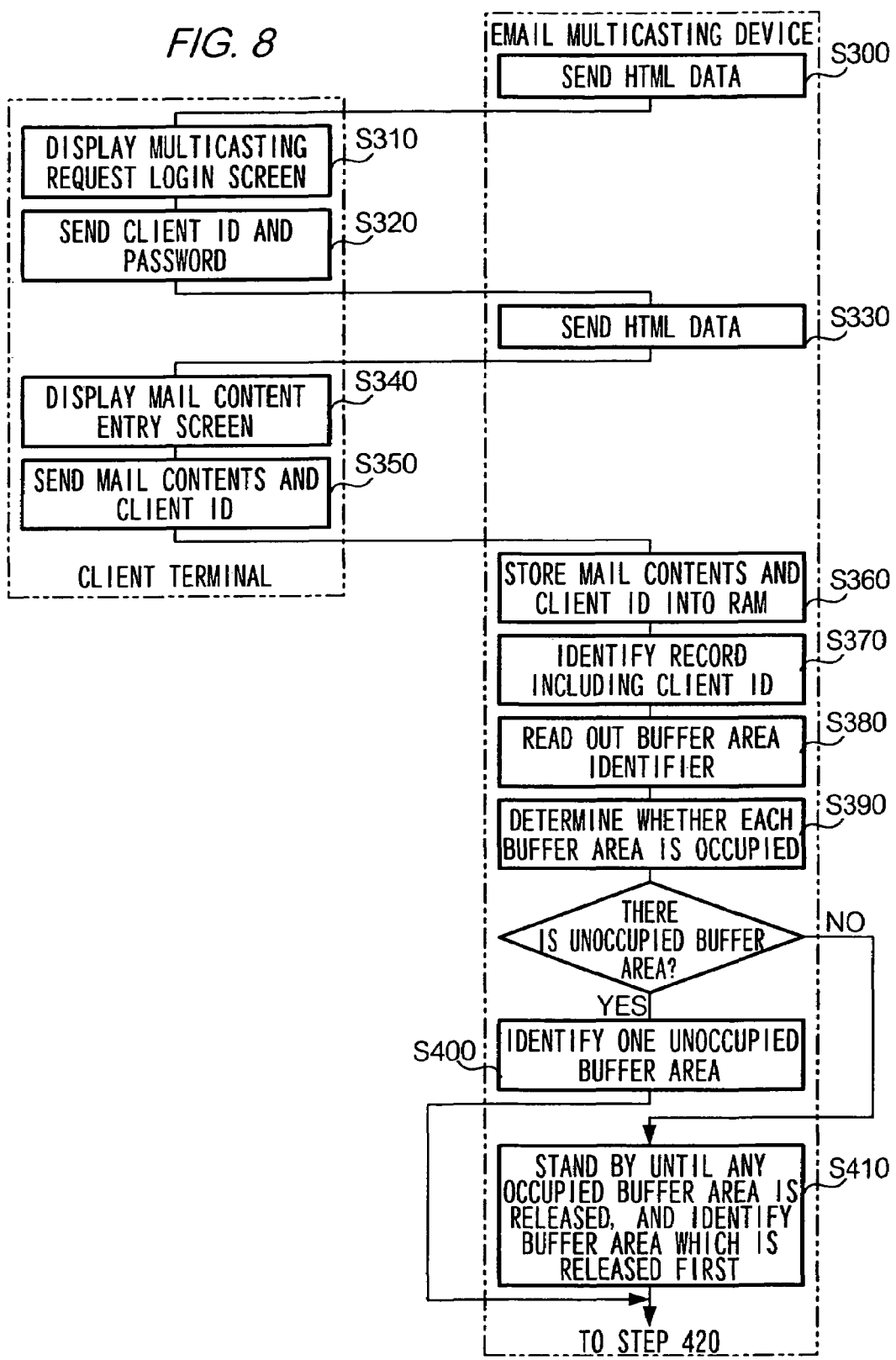
FIG. 8 is a flowchart showing a part of a multicasting process.
Figure 9:
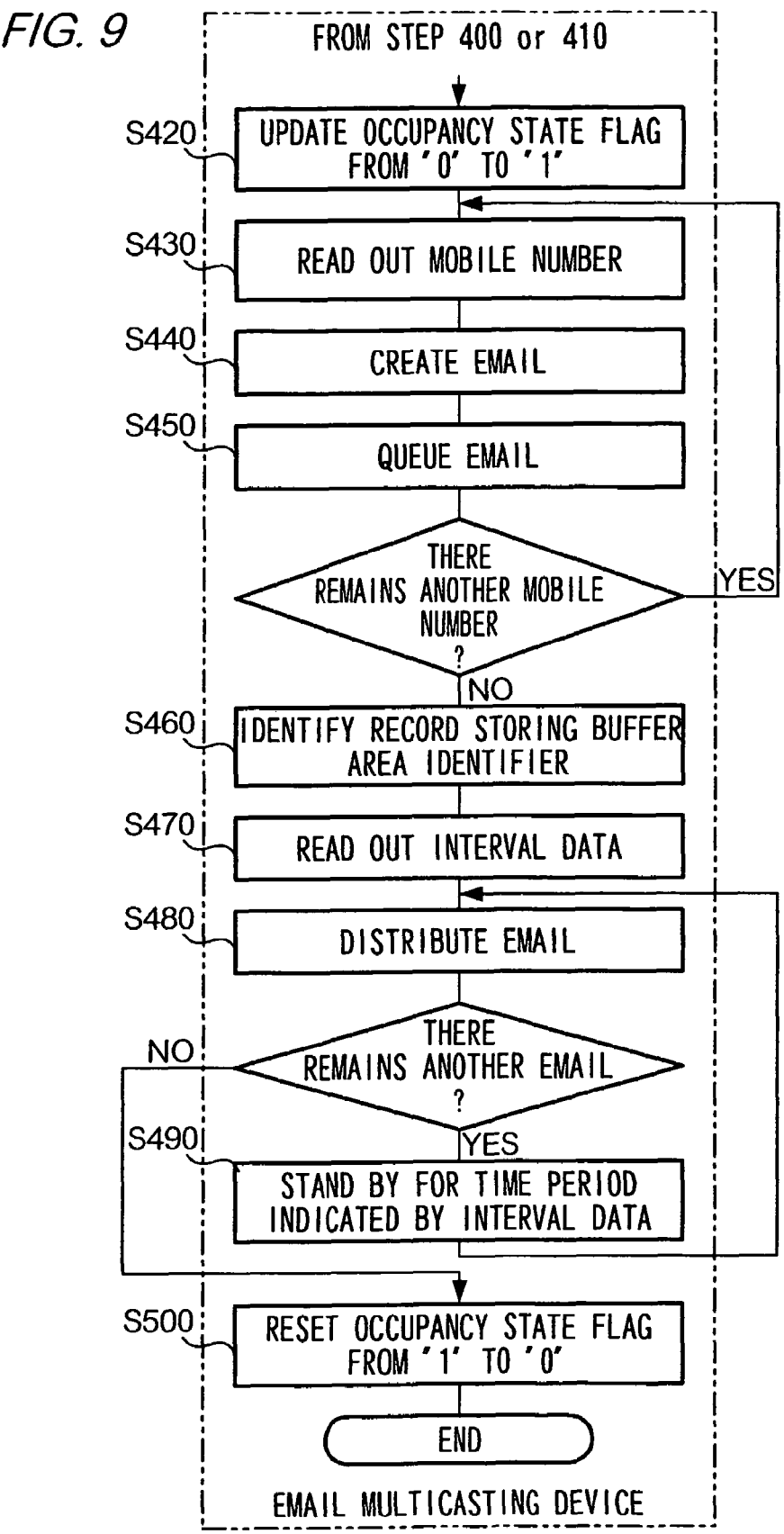
FIG. 9 is a flowchart showing a part of the multicasting process.

FIGS. 8 and 9 are flowcharts showing the multicasting process. The process is started when client terminal 10 of a client accesses a website for multicasting request by designating the URL of the website. In the following description, it is assumed that client terminal 10 of the client has already registered mobile numbers with email multicasting device 20 in the above destination registration process.

When client terminal 10 accesses the website by designating the URL of the website, CPU 21 of email multicasting device 20 reads out HTML data identified by the URL from its hard disk 24 and sends it to client terminal 10 (S300).

CPU 11 of client terminal 10, when receiving the HTML data, causes display 15 to display a multicasting request login screen on the basis of the HTML data (S310). The screen displays a message "This is a site for multicasting request. Please enter your client ID and password." and entry fields where a client ID and a password can be entered. An operator of the client terminal 10 enters the client ID and password of the client in the entry fields on the screen.

CPU 11 of client terminal 10 sends the entered client ID and password to email multicasting device 20 (S320).

CPU 21 of email multicasting device 20 authenticates the client on the basis of the client ID and password received from client terminal 10, and if the authentication is completed, sends HTML data of a mail contents entry screen to client terminal 10 (S330).

CPU 11 of client terminal 10, when receiving the HTML data, causes display 15 to display the mail contents entry screen on the basis of the HTML data (S340). The screen displays a message "Please enter mail contents to be multicast." and an entry field where mail contents can be entered. The operator of client terminal 10 enters mail contents in the entry field using keyboard 27. Alternatively, the operator may cause client terminal 10 to call up a prepared document file to the entry field.

When mail contents are entered, CPU 11 of client terminal 10 sends the entered mail contents and the client ID entered on the multicasting request login screen to email multicasting device 20 (S350).

CPU 21 of email multicasting device 20 stores in RAM 22 the mail contents and the client ID received from client terminal 10 (S360).

Subsequently, CPU 21 refers to client information database 24c stored in its hard disk 24 to identify a record including the client ID stored in RAM 22 in S360 (S370).

When the record is identified, CPU 21 reads out buffer area identifiers stored in the "buffer area" field of the record and writes them in RAM 22 (S380). In the present embodiment, a set of the buffer area identifiers of buffer areas a to c, a set of the buffer area identifiers of buffer areas d to f, or a set of the buffer area identifiers of buffer areas g to i is read and written in RAM 22 (see FIG. 5).

Subsequently, CPU 21 determines whether each of the buffer areas identified by the buffer area identifiers written in RAM 22 is currently occupied, by referring to data stored in the "occupancy state flag" field of buffer-related information database 24b (S390). Specifically, CPU 21 refers to data stored in the "occupancy state flag" field associated with each of the buffer area identifiers written in RAM 22, and if the data of the field is "1", CPU 21 determines that the buffer area associated with the field is occupied, and if the data of the field is "0", CPU 21 determines that the buffer area associated with the field is not occupied.

If it is determined in S390 that there is an unoccupied buffer area, CPU 21 designates the buffer area as a buffer area for queuing emails (S400). If there are plural unoccupied buffer areas, CPU selects any one of the plural buffer areas.

On the other hand, if there is not an unoccupied buffer area, CPU 21 stands by until any of the buffer areas identified by the buffer area identifiers written in RAM 22 is released, and designates a buffer area which is released first as a buffer area for queuing emails (S410).

When a buffer area is designated, CPU 21 identifies a record relating to the designated buffer area in the buffer-related information database 24b, and updates data stored in the "occupancy state flag" of the identified record from "0" to "1" (S420).

Subsequently, CPU 21 reads out one of the mobile numbers stored in the "destination" field of the record identified in S370 (S430).

CPU 21 creates an email which contains the mail contents stored in RAM 22 in S360 as a main body and which contains the mobile number read out in S430 (S440) as a destination, and queues the email in the designated buffer area (S450).

CPU 21 determines whether there is a mobile number which has not been read out in the "destination" field of the record identified in S370, and if the determination is affirmative, returns to the process of S430. The processes of S430 to S450 are repeated, until all of the mobile numbers stored in the "destination" field of the record identified in S370 are read out and emails each of which contains one of the mobile number as a destination are queued.

When emails containing the mobile numbers are queued, CPU 21 identifies a record including the buffer area identifier read out in S380 in buffer-related information database 24b (S460).

CPU 21 reads out interval data stored in the "distribution interval" field of the identified record, and writes it in RAM 22 (S470).

CPU 21 reads out an email which has been queued in the buffer area first and sends the email to a network (S480).

CPU 21, if there is an unsent email in the buffer area, stands by for a time period indicated by interval data read out in S470 (S490).

When the time period indicated by interval data elapses, CPU 21 returns to the process of S480. The processes of S480 and S490 are repeated, until all of the emails queued in the buffer area are sent.

If the emails queued in the buffer area are all sent, CPU 21 updates the occupancy state flag from a value "1" to a value "0" (S500), and ends the present multicasting process.

As described above, in the present embodiment, email multicasting device 20 receives from each client, mobile numbers of users which are destinations of mail contents created by the client, and sets a distribution interval appropriate for the number of the received mobile numbers. If email multicasting device 20 receives from a client, mail contents to be multicast, the device queues emails each of which contains the mail contents and a mobile number registered by the client in a buffer area, and sends the queued emails sequentially at time intervals indicated by interval data associated with the client. Accordingly, if the destinations of the queued emails are concentrated on one area, congestion on a network of the area can be prevented.

Second Embodiment

A second embodiment of the present invention will be described. In a destination registration process of the first embodiment, email multicasting device 20 stores mobile numbers acquired from each client terminal 10 in its client information database 24c, and upon receipt of a multicasting request of mail contents from client terminal 10, multicasts the mail contents to mobile communication terminals identified by mobile numbers which have been acquired from client terminal 10. In contrast, in the present embodiment, client terminal 10 informs email multicasting device 20 of mobile numbers of users which are destinations of mail contents, each time client terminal 10 requests email multicasting device 20 to multicast the email contents.

A hardware configuration of client terminal 10 of the present embodiment is the same as that of the first embodiment. A hardware configuration of email multicasting device 20 is the same as that of the first embodiment except for a data configuration of client information database 24c stored in hard disk 24.

Figure 10:
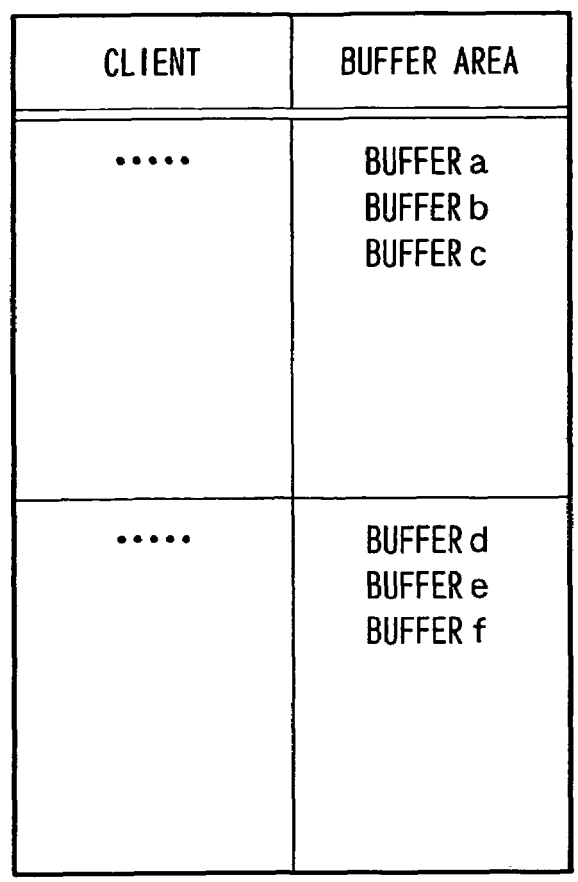
FIG. 10 is a diagram showing a data configuration of a client information database.

FIG. 10 is a diagram showing a data configuration of client information database 24c. One record constituting the database has two fields: "client"; and "buffer area", but does not have a "destination" field. Data stored in the fields of the database is entered manually as described below.

A client notifies a carrier of the approximate number of destinations of mail contents created by the client and their client ID. An operator of the carrier who has received the notification adds a new record to client information database 24c and enters the client ID in the "client" field of the record. The operator also enters a buffer area identifier in the "buffer area" field of the record. If the notified number of destinations is less than 500, the buffer area identifiers of the buffer areas a to c belonging to the first group are stored in the "buffer area" field; if the number is 500 or more and less than 100, the buffer area identifiers of the buffer areas d to f belonging to the second group are stored; and if the number is 1000 or more, the buffer area identifiers of the buffer areas g to i belonging to the third group are stored.

As described above, in the present embodiment, since data of client information database 24c is entered manually, a destination registration process as described in the first embodiment is not carried out and only a multicasting process is carried out.

Figure 11:
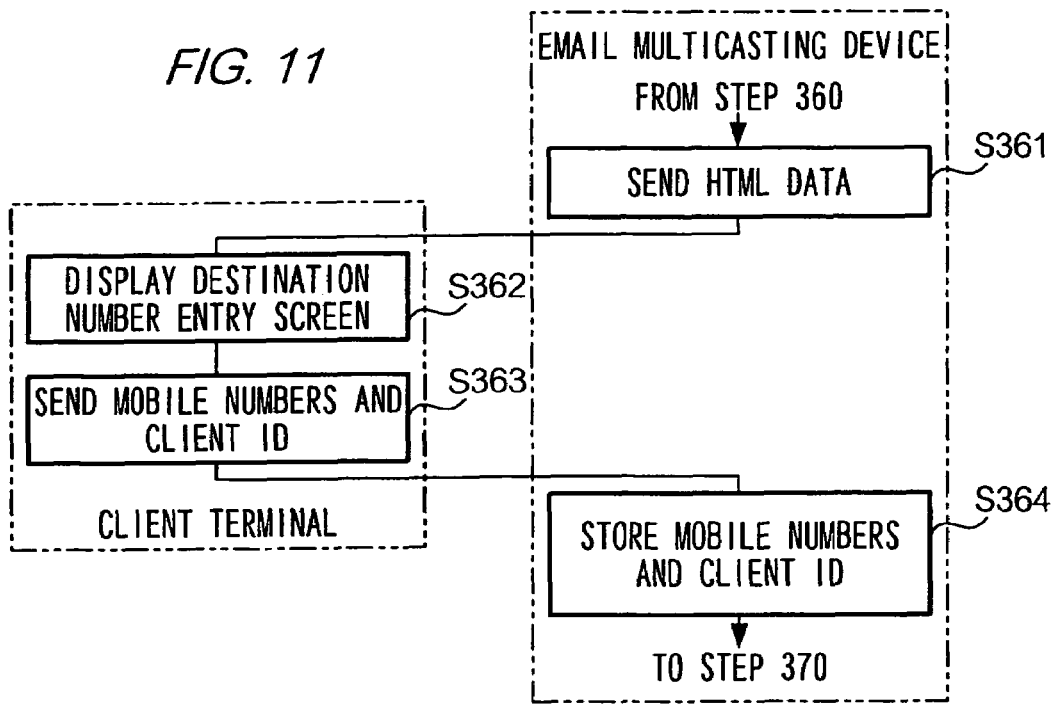
FIG. 11 is a flowchart showing a part of the multicasting process.

Now, an operation of the present embodiment will be described. FIG. 11 is a flowchart showing a part of a multicasting process according to the present embodiment. The multicasting process of the present embodiment is different from that of the first embodiment in that processes of S360 to S364 are carried out between processes of S360 and S370 of the first embodiment.

CPU 21 of email multicasting device 20, which has received mail contents and a client ID from the client terminal 10 in S360, sends HTML data of a destination number entry screen to client terminal 10 (S361).

CPU 11 of client terminal 10, when receiving the HTML data, causes display 15 to display the destination number entry screen on the basis of the HTML data (S362). The screen displays a message "Please enter mobile numbers of users which are destinations of an email." and plural entry fields where mobile numbers can be entered. An operator of client terminal 10 enters in the entry fields, the mobile numbers of users who have performed a registration procedure for receiving emails from the client.

When mobile numbers are entered, CPU 11 of client terminal 10 sends the entered mobile numbers and a client ID entered on a destination registration login screen to email multicasting device 20 (S363).

CPU 21 of email multicasting device 20 stores in RAM 22 the mobile numbers and the client ID received from client terminal 10 (S364).

Processes of S370 and subsequent steps are the same as those of the first embodiment.

As described above, in the present embodiment, client terminal 10 informs email multicasting device 20 of mobile numbers of users which are destinations of mail contents, each time client terminal 10 requests email multicasting device 20 to multicast the email contents. Accordingly, a client can change destinations of mail contents from a multicasting request to another, and yet congestion on a network can be prevented, on condition that the number of the destinations is less than or equal to the number which has been notified to email multicasting device 20 in advance.

Third Embodiment

A third embodiment of the present invention will be described. In the above embodiments, buffer areas are divided into three groups in accordance with the number of destinations, and if the buffer areas belonging to a certain group necessary for queuing emails are all occupied, CPU 21 of email multicasting device 20 stands by until any of the buffer areas is released and queues emails in a released buffer area. In contrast, in the present embodiment, if the buffer areas belonging to a certain group necessary for queuing emails are all occupied, a buffer area belonging to another group is designated as a buffer area for queuing emails instead. Hardware configurations of client terminals 10 and email multicasting device 20 of the present embodiment are the same as those of the first embodiment.

Now, an operation of the present embodiment will be described. The operation of the present embodiment is divided into a destination registration process and a multicasting process, and the destination registration process is the same as that of the first embodiment. Accordingly, only the multicasting process will be described below.

Figure 12:
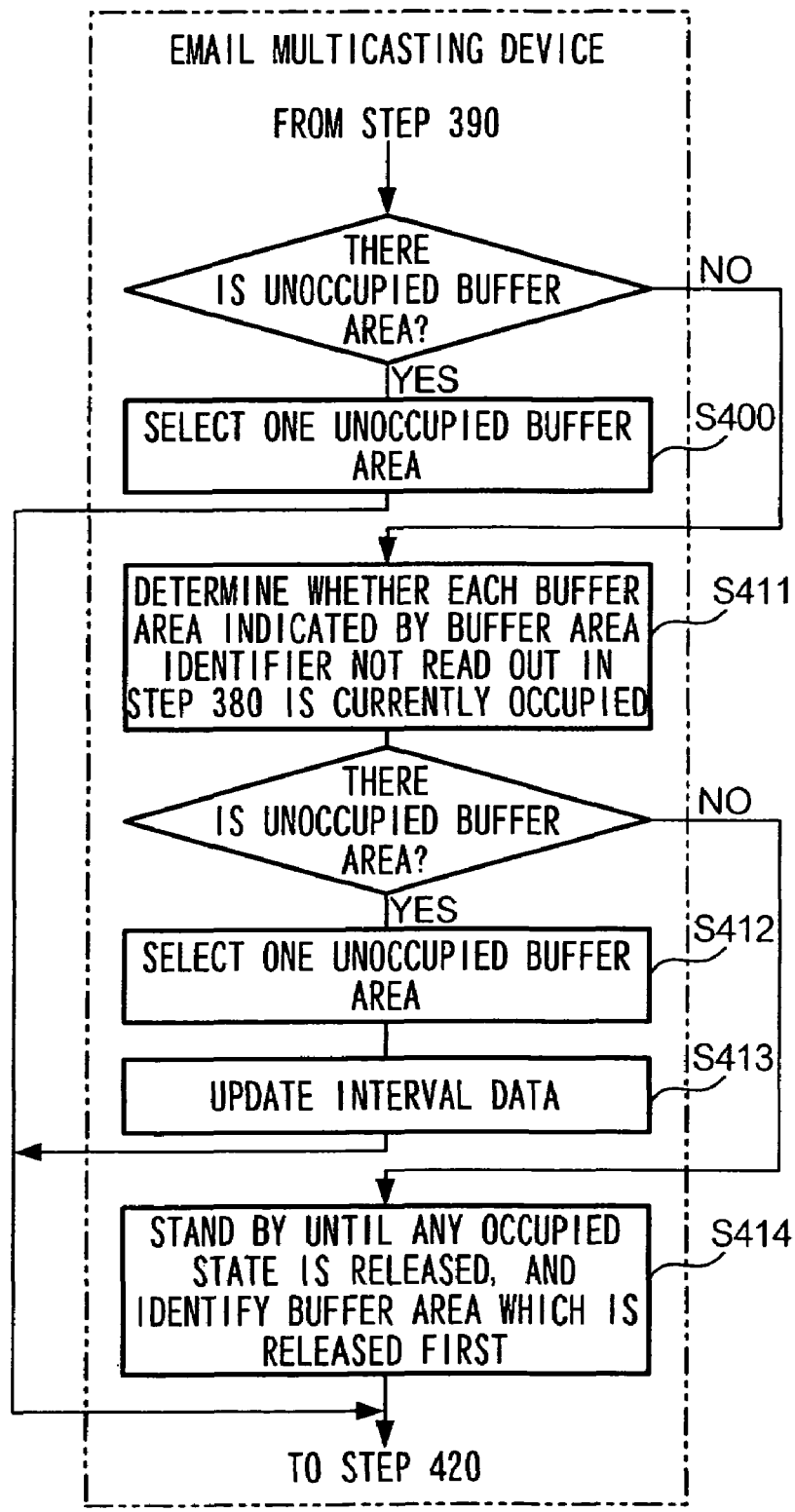
FIG. 12 is a flowchart showing a part of the multicasting process.

FIG. 12 is a flowchart showing a part of the multicasting process. The multicasting process of the present embodiment is different from that of the first embodiment in that processes of S411 to S414 are carried out instead of a process of S410 of the first embodiment.

If it is determined in S390 that there is no unoccupied buffer area, CPU 21 of email multicasting device 20 determines whether buffer areas other than those identified by buffer area identifiers read out in S380 are occupied (S411). For example, if the buffer area identifiers of the buffer areas a to c belonging to the first group are read out in S380, it is determined whether the buffer areas d to f belonging to the second group and the buffer areas g to i belonging to the third group are occupied.

If it is determined in S411 that any of the buffer areas is unoccupied, CPU 21 designates a buffer area as a buffer area for queuing emails (S412). Subsequently, CPU 21 identifies a record including the buffer area identifier of the buffer area on buffer-related information database 24b, and updates interval data stored in the "distribution interval" field of the record with interval data stored in association with the buffer area identifier read out in S380 (S413). When the update operation is completed, CPU 21 proceeds to a process of S420.

On the other hand, if it is determined in S411 that there is not an unoccupied buffer area, CPU 21 carries out the same process as that of S410 of the first embodiment, namely CPU 21 stands by until any of the buffer areas identified by the buffer area identifiers written in RAM 22 in S380 is released, and designates a buffer area which is released first as a buffer area for queuing emails (S414). When a buffer area is designated, CPU 21 proceeds to a process of S420.

Processes of S420 to S500 are the same as those of the first embodiment except that CPU 21 updates interval data updated in S413 with an original data in addition to updating the occupancy state flag from "1" to "0".

As described above, in the present embodiment, if buffer areas belonging to a certain group which have been assigned to a client are all occupied, a buffer area belonging to another group is used instead. However, multicasting of emails queued in the substitute buffer area is performed at time intervals indicated by interval data associated with the buffer area which has been assigned to the client, not with the buffer area being used. Accordingly, according to the present embodiment, buffer areas can be used effectively, and yet congestion on a network can be prevented.

Fourth Embodiment

A fourth embodiment of the present invention will be described. A hardware configuration of client terminals 10 of the present embodiment is the same as that of the first embodiment. On the other hand, a hardware configuration of email multicasting device 20 of the present embodiment is different from that of the first embodiment in that hard disk 24 of email multicasting device 20 stores a buffer area availability and interval data database (none of which is shown) instead of client information database 24c and buffer-related information database 24b.

FIG. 13 is a diagram showing a data configuration of buffer area availability database. One record constituting the database has two fields: "buffer area"; and "occupancy state flag".

In the "buffer area" field, the buffer area identifier of any of the buffer areas a to i is stored. In the "occupancy state flag" field, a value "1" indicating that a buffer area is occupied or a value "0" indicating that a buffer area is not occupied is stored.

FIG. 14 is a diagram showing a data configuration of the interval data database. One record constituting the database has two fields: "distribution interval"; and "email number". In the "distribution interval" fields, interval data of "0.1", "0.2" and "0.5" is stored, respectively. In each "email number" field, the number of emails is stored, which does not cause a congestion on a network when the emails are multicast at time intervals indicated by interval data associated with the email number in the database.

Figure 15:
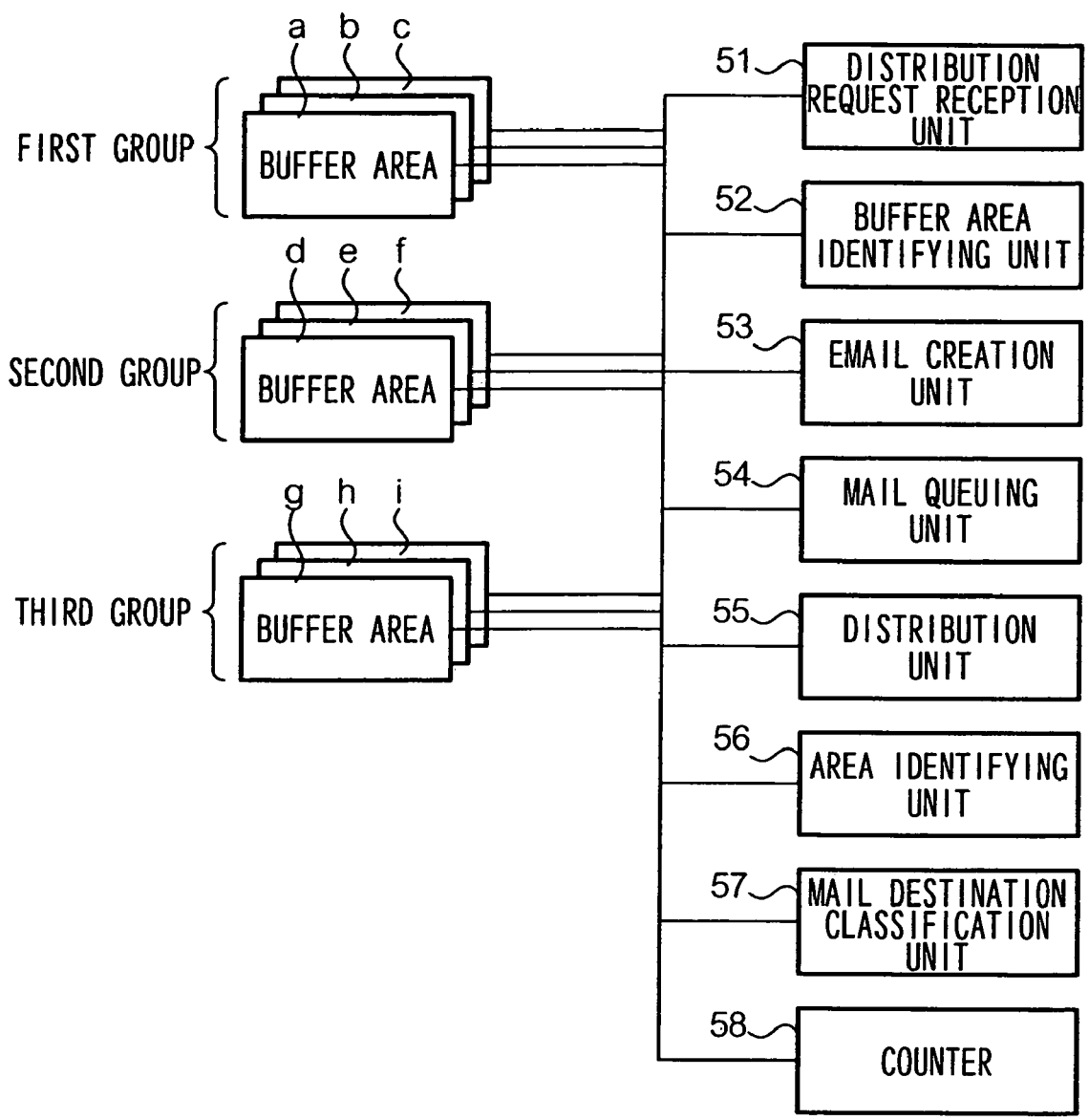
FIG. 15 is a diagram showing a logical configuration realized by the email multicasting device.

In the present embodiment, when CPU 21 of email multicasting device 20 executes email multicasting program 24a while using RAM 22 as a working area, units shown in FIG. 15 are realized logically. Specifically, plural buffer areas a to i for queuing emails are reserved in RAM 22, and CPU 21 functions as distribution request reception unit 51, buffer area identifying unit 52, email creation unit 53, mail queuing unit 54, distribution unit 55, area identifying unit 56, mail destination classification unit 57, and counter 58.

Among the above units, since operations of distribution request reception unit 51, buffer area identifying unit 52, email creation unit 53, mail queuing unit 54, and distribution unit 55 are described in the first embodiment, operations of only area identifying unit 56, mail destination classification unit 57, and counter 58 will be described.

Area identifying unit 56 acquires area data indicating an area where mobile communication terminal 60 is located from a mobile packet communication network. Mail destination classification unit 57 classifies mobile numbers of mobile communication terminals of users which are destinations of an email according to an area where each terminal is located. Counter 58 counts the number of mobile numbers classified on an area-by-area basis by mail destination classification unit 57.

Now, an operation of the present embodiment will be described. The operation of the present embodiment is divided into an email queuing process and an email distribution process.

Figure 16:
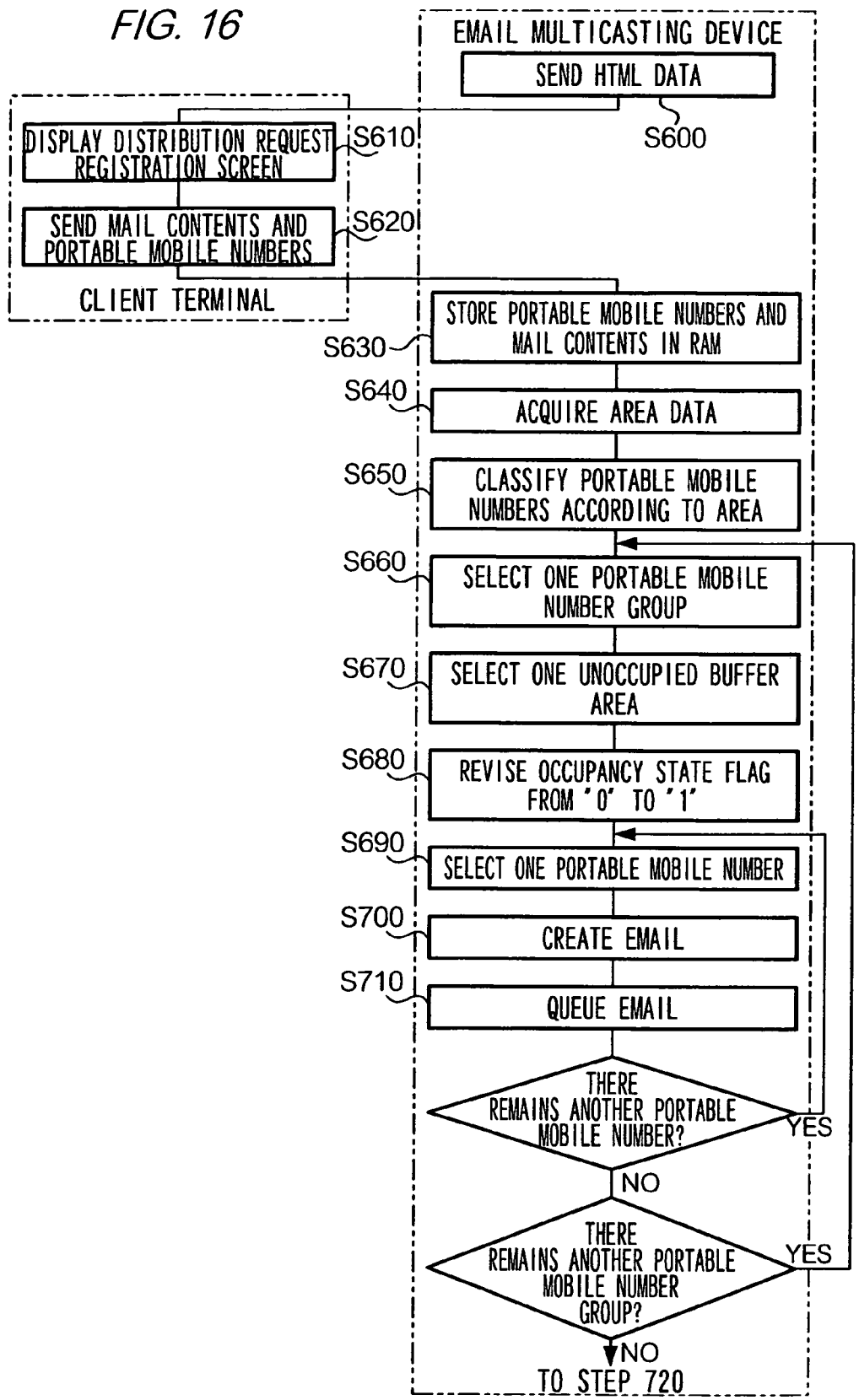
FIG. 16 is a flowchart showing an email queuing process.

FIG. 16 is a flowchart showing the email queuing process. The process is started when client terminal 10 of a client accesses a website for a distribution request registration process by designating the URL (Uniform Resource Locator) of the website.

When client terminal 10 accesses the website by designating the URL of the website, CPU 21 of email multicasting device 20 reads out HTML data identified by the URL from hard disk 24 and sends it to client terminal 10 (S600).

CPU 11 of client terminal 10, when receiving the HTML data, causes display 15 to display a destination registration login screen on the basis of the HTML data (S610). The screen displays a message "Please enter mail contents to be multicast and mobile numbers to be registered as destinations of the mail contents.", an entry field where mail contents can be entered, and plural entry fields where mobile numbers can be entered. A client ID and a password are not needed to be entered, unlike the above embodiments. An operator of client terminal 10 enters mail contents and mobile numbers in the entry fields on the screen.

When mail contents and mobile numbers are entered, CPU 11 of client terminal 10 sends the entered mail contents and mobile numbers to email multicasting device 20 (S620).

CPU 21 of email multicasting device 20 stores in RAM 22 the mail contents and mobile numbers received from client terminal 10 (S630).

Subsequently, CPU 21 acquires area data of mobile communication terminals having the mobile numbers stored in RAM 22 from a mobile packet communication network (S640).

When area data is acquired, CPU 21 classifies on the basis of the area data, the mobile numbers stored in RAM 22 into groups on an area-by-area basis (S650).

CPU 21 selects one group of mobile numbers as processing objects (S660). CPU 21 also selects one buffer area which is not occupied (S670), and updates the occupancy state flag associated with the buffer area from a value "0" to a value "1" (S680).

CPU 21 selects one mobile number from the selected group of mobile numbers (S690), and creates an email which contains the mobile number as a destination and which contains the mail contents as a main body (S700).

CPU 21 queues the created email in the buffer area selected in S670 (S710).

CPU 21 determines whether there is a mobile number which has not been read out, and if the determination is affirmative, returns to the process of S690. The processes of S690 to S710 are repeated, until all of the mobile numbers selected as processing objects in S660 are read out and emails each of which contains one of the mobile number as a destination are queued.

When emails containing the mobile numbers belonging to the selected group are queued, CPU 21 selects another group of mobile numbers as processing objects and repeats the processes of S660 and subsequent steps.

When the mail queuing process is completed, CPU 21 starts an email distribution process.

Figure 17:
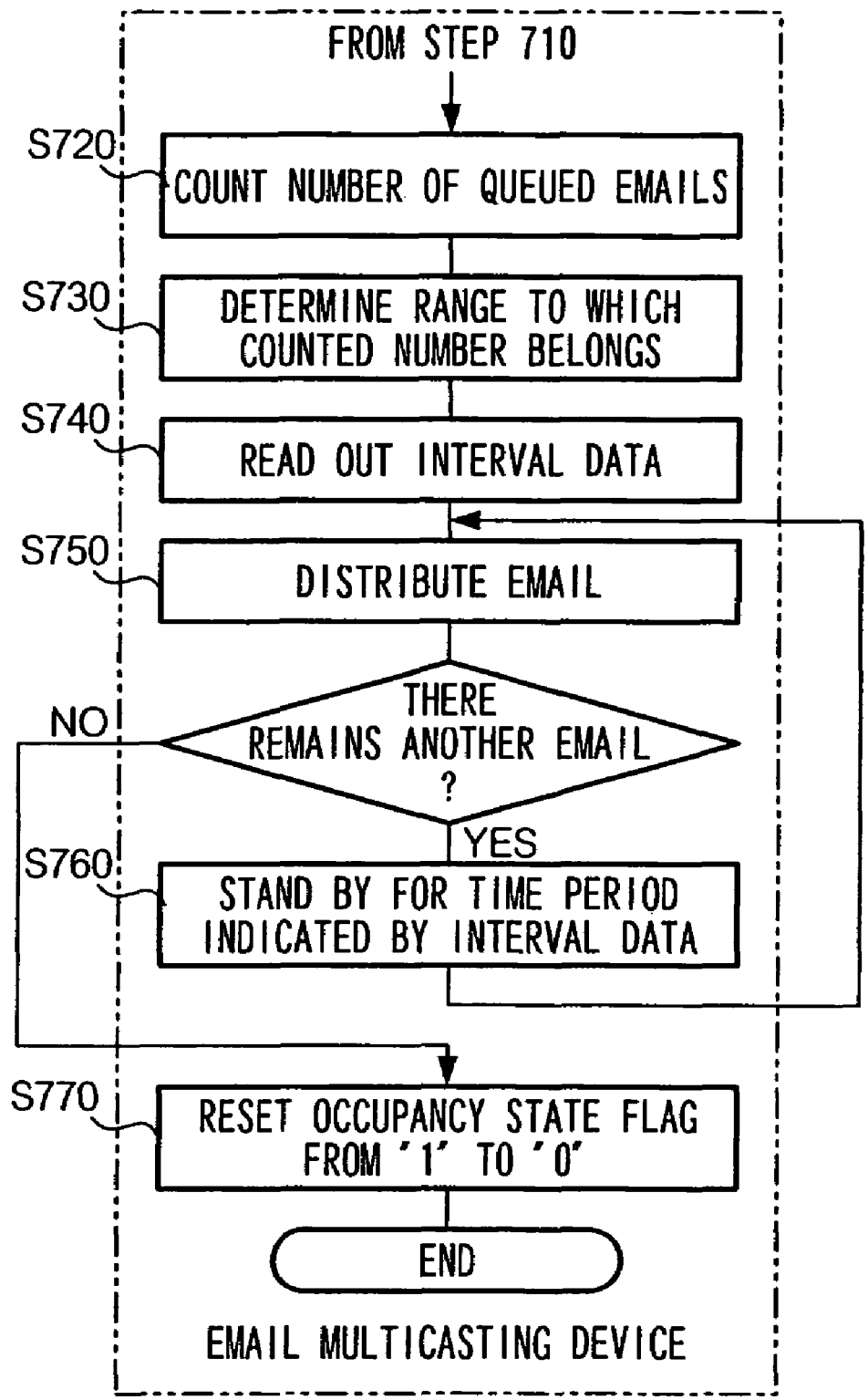
FIG. 17 is a flowchart showing an email distribution process.

FIG. 17 is a flowchart showing the email distribution process. The process is performed in parallel for each buffer area where emails are queued, but for convenience of explanation, a process performed for one buffer area will be described below.

CPU 21 counts the number of emails queued in the buffer area which are processing objects (S720), and determines a range to which the counted number belongs from among three ranges of less than 500, 500 or more and less than 1000, and 1000 or more (S730).

CPU 21 identifies a record associated with the range determined in S730 in an interval data database, reads out interval data stored in the "distribution interval" field of the record, and writes the interval data in RAM 22 (S740).

CPU 21 reads out an email which has been queued in the buffer area first and sends the email to a network (S750).

CPU 21, if there is an unsent email in the buffer area, stands by for a time period indicated by interval data read out in S740 (S760).

When the time period indicated by interval data elapses, CPU 21 returns to the process of S750. The processes of S750 and S760 are repeated, until all of the emails queued in the buffer area are sent.

If the emails queued in the buffer area are all sent, CPU 21 updates the occupancy state flag from a value "1" to a value "0" (S770), and ends the present email distribution process.

As described above, in the present embodiment, data of an area where each of mobile communication terminals 60 of users which are destinations of an email is currently located is acquired, and on the basis of the identified area, emails addressed to each of mobile communication terminals 60 are classified into groups on an area-by-area basis and queued in different buffer areas. The emails queued in the buffer areas are counted on a buffer area basis, namely counted on a distribution area basis, and counted emails are distributed at time intervals appropriate for the counted number.

The invention claimed is:

1. An email multicasting device, comprising:
a plurality of buffer areas;
buffer-related information storage means which stores a buffer area identifier of each of the buffer areas in association with interval data indicating a distribution time interval at which emails queued in the buffer area are sent;
client information storage means which stores a client identifier of a client requesting email distribution in association with a plurality of email destinations notified by the client in advance and a buffer area identifier;
distribution request reception means which receives mail contents to be multicast as an email and a client identifier;
buffer area identifying means which reads out a buffer area identifier associated with the client identifier received by the distribution request reception means from the client information storage means, and identifies a buffer area identified by the buffer area identifier;
email creation means which reads out a plurality of email destinations associated with the client identifier received by the distribution request reception means from the client information storage means, and creates a plurality of emails each of which contains the mail contents received by the distribution request reception means and one of the plurality of email destinations;
queuing means which queues the plurality of emails created by the email creation means in the buffer area identified by the buffer area identifying means; and
email distribution means which reads out interval data associated with the buffer area identifier read out by the buffer area identifying means, from the buffer-related information storage means, and distributes the plurality of emails queued by the queuing means sequentially at time intervals indicated by the interval data.

2. An email multicasting device, comprising:
a plurality of buffer areas;
a buffer-related information storage database configured to store a plurality of respective buffer area identifiers of each of the buffer areas in association with interval data indicating a distribution time interval at which emails queued in a respective one of the buffer areas are sent;
a client information storage database configured to store a client identifier of a client requesting email distribution, in association with a buffer area identifier, and a plurality of email destinations previously stored in the client information storage database;
a processor configured to receive a distribution request from the client, the distribution request comprising the client identifier and mail contents to be multicast as an email;
the processor further configured to read out of the client information storage database the buffer area identifier associated with the client identifier received with the distribution request,. and identify a buffer area identified by the buffer area identifier;
the processor further configured to read out of the client information storage database the plurality of email destinations associated with the client identifier received with the distribution request, and create a plurality of email messages each of which contains one of the plurality of email destinations and the mail contents received with the distribution request;

the processor further configured to queue the plurality of created email messages in the identified buffer area; and the processor further configured to read out from the buffer-related information storage database the interval data associated with the buffer area identifier, and distribute the queued plurality of created email messages sequentially at the distribution time interval indicated by the interval data.

3. An email multicasting device according to claim 2, wherein the processor further configured to queue the plurality of created email messages in the identified buffer area further comprises the processor further configured to identify another buffer area that is unoccupied in response to the identified buffer area being already occupied.

4. An email multicasting device according to claim 2, wherein the processor further configured to queue the plurality of created email messages in the identified buffer area further comprises the processor, in response to the identified buffer area being already occupied, is further configured to stand by and wait until the identified buffer area is unoccupied to queue the plurality of created email messages in the identified buffer area.

5. An email multicasting device according to claim 2, wherein each of the email destinations is a mobile phone number.

6. An email multicasting device according to claim 2, wherein each of buffer areas are groups of buffer areas, and each of the groups of buffer areas is associated with different interval data.

7. An email multicasting device according to claim 2, wherein the processor is further configured to choose the buffer area identifier for storage in the client information storage database based on a quantity of the plurality of email destinations previously stored in the client information storage database.

8. An email multicasting device, comprising:

a plurality of buffer areas;

a buffer-related information storage database configured to store a plurality of respective buffer area identifiers of each of the buffer areas in association with respective interval data indicating a distribution time interval at which emails queued in a respective one of the buffer areas are sent;

a client information storage database configured to store a buffer area identifier in association with a client identifier of a client requesting email distribution;

a processor configured to receive a distribution request comprising the client identifier, a plurality of email destinations, and mail contents to be multicast to the plurality of email destinations;

the processor further configured to read out of the client information storage database the buffer area identifier associated with the client identifier received in the distribution request and identify a buffer area identified by the buffer area identifier;

the processor further configured to create a plurality of email messages each of which contains one of the plurality of email destinations received in the distribution request, and the mail contents received in the distribution request;

the processor further configured to queue the plurality of created email messages in the identified buffer area; and the processor further configured to read out of the buffer-related information storage database the interval data associated with the buffer area identifier, and distribute the queued plurality of created email messages sequentially at the distribution time interval indicated by the interval data.

9. An email multicasting device according to claim 8, wherein the processor further configured to queue the plurality of created email messages in the identified buffer area further comprises the processor further configured to identify another buffer area that is unoccupied in response to the identified buffer area being already occupied.

10. An email multicasting device according to claim 8, wherein the client information storage database is configured to receive a manual entry of the buffer area identifier and the client identifier for storage in one of a plurality of client records included in the client information storage database in advance of receipt by the processor of the distribution request.

11. An email multicasting device, comprising:

a plurality of buffer areas;

a processor configured to store interval data for each of the buffer areas, the interval data indicating a distribution time interval at which emails queued in a respective one of the buffer areas are sent, the interval data stored in association with a range of a quantity of emails, the emails queued in a respective one of the buffer areas are distributed sequentially at the distribution time interval indicated by the interval data of the respective one of the buffer areas;

the processor further configured to receive a client identifier, a plurality of email destinations, and mail contents to be multicast to the email destinations;

the processor further configured to obtain area data indicating a respective area where each of the email destinations is currently located;

the processor further configured to classify into groups the email destinations based on the area data;

the processor further configured to create a plurality of email messages for one of the groups, the created email messages each containing the mail contents and one of the email destinations classified in the one of the groups;

the processor further configured to queue the created email messages in a buffer area;

the processor further configured to determine a total number of the created email messages queued in the buffer area;

the processor further configured to read out the interval data associated with the range within which the total number resides; and the processor further configured to distribute the created email messages sequentially at the distribution time interval indicated by the interval data.

12. An email multicasting device according to claim 11, wherein the processor is further configured to receive the email destinations, the mail contents, and the client identifier in a distribution request from the user.

13. An email multicasting device according to claim 11, wherein the processor is further configured to receive the mail contents and the client identifier in a distribution request from the user, and receive the email destinations from a database in which the email destinations were prestored prior to receipt of the distribution request.

14. An email multicasting device according to claim 11, wherein the interval data is different for each of the buffer areas.

15. An email multicasting device according to claim 11, wherein each of the email destinations are a mobile phone number of one of a plurality of respective mobile devices, and each of the respective areas includes a current location of at least one of the respective mobile devices.

16. An email multicasting device, comprising:
a memory having a plurality of buffer areas; and
a processor in communication with the memory;
the memory configured with a first database to store a client identifier in association with one of a plurality of buffer area identifiers;
the memory further configured with a second database configured to store interval data in association with a buffer area identifier for each one of the respective buffer areas, the interval data indicating a distribution time interval at which emails queued in the respective one of the buffer areas are sent;
the processor configured to create a plurality of email messages in response to receipt of a distribution request that includes the client identifier and mail contents, each of the email messages created to include the mail contents as the main body, and an address of one of a plurality of email recipients; and
the processor further configured to queue the created email messages in one of the buffer areas identified with the one of the buffer area identifiers stored in association with the client identifier, and sequentially distribute the created email messages at the distribution time interval indicated with the interval data associated with the one of the buffer areas.

17. The email multicasting device of claim 16, wherein the address of each of the email recipients is included in the distribution request.

18. The email multicasting device of claim 16, wherein the address of each of the email recipients is prestored in the first database in association with the client identifier, in advance of receipt of the distribution request.

19. The email multicasting device of claim 18, wherein the processor is further configured to determine the one of the buffer area identifiers based on a quantity of addresses prestored in the first database in association with the client identifier.

20. The email multicasting device of claim 16, wherein the processor is further configured to access the first database and obtain the one of the buffer area identifiers stored in association with the client identifier received in the distribution request.

21. The email multicasting device of claim 16, wherein the mail content is representative of a main body of an email or a previously prepared document file, and each of the email messages is created to include the mail contents as the main body or the previously prepared document file.

22. The email multicasting device of claim 16, wherein the buffer area identifier is received from the user and stored in the first database.

23. The email multicasting device of claim 22, wherein the buffer area identifier is received in the distribution request.

* * * * *

UNITED STATES PATENT AND TRADEMARK OFFICE
CERTIFICATE OF CORRECTION

PATENT NO. : 7,590,700 B2  Page 1 of 1
APPLICATION NO. : 11/215143
DATED : September 15, 2009
INVENTOR(S) : Hirose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Twenty-first Day of September, 2010

David J. Kappos
*Director of the United States Patent and Trademark Office*